United States Patent
Breon

(10) Patent No.: US 10,921,226 B2
(45) Date of Patent: Feb. 16, 2021

(54) APPARATUS AND METHOD FOR TESTING MECHANICAL MATERIALS

(71) Applicant: Electric Power Research Institute, Inc., Palo Alto, CA (US)

(72) Inventor: Luke Justin Breon, Concord, NC (US)

(*) Notice: Subject to any disclaimer, the term of this patent is extended or adjusted under 35 U.S.C. 154(b) by 106 days.

(21) Appl. No.: 15/994,489

(22) Filed: May 31, 2018

(65) Prior Publication Data

US 2019/0368989 A1 Dec. 5, 2019

(51) Int. Cl.
*G01N 3/08* (2006.01)
*G01N 3/04* (2006.01)

(52) U.S. Cl.
CPC ............... *G01N 3/08* (2013.01); *G01N 3/04* (2013.01); *G01N 2203/0017* (2013.01); *G01N 2203/0032* (2013.01); *G01N 2203/0075* (2013.01); *G01N 2203/0206* (2013.01); *G01N 2203/0244* (2013.01); *G01N 2203/0423* (2013.01)

(58) Field of Classification Search
CPC ........ G01N 3/08; G01N 3/04; G01N 2203/00; G01N 2203/0017; G01N 2203/0032; G01N 2203/0075; G01N 2203/0067; G01N 2203/0206; G01N 2203/0244; G01N 2203/0423; G01L 1/00; G01L 1/22; G01L 1/225; G01L 5/0038; G01L 3/1464; G01L 5/00; A61B 5/0048
See application file for complete search history.

(56) References Cited

U.S. PATENT DOCUMENTS

| | | | | |
|---|---|---|---|---|
| 5,798,463 A * | 8/1998 | Doudican | ............... | G01N 3/08 73/789 |
| 6,487,902 B1 * | 12/2002 | Ghosh | ................... | G01L 5/045 73/159 |
| 6,860,156 B1 * | 3/2005 | Cavallaro | ............... | G01N 3/08 73/813 |
| 7,228,746 B2 * | 6/2007 | Maubant | ................. | G01B 7/16 73/849 |
| 8,671,771 B2 * | 3/2014 | Hanabusa | ............... | G01N 3/04 73/826 |
| 9,261,419 B2 * | 2/2016 | Kempainen | ........... | G01L 1/2218 |
| 9,958,365 B2 * | 5/2018 | Heinlein | ............... | G01N 3/068 |
| 2002/0095995 A1 * | 7/2002 | Willson-Hackworth | .................... | G01N 3/04 73/826 |
| 2010/0242620 A1 * | 9/2010 | Lorenz | ..................... | A61F 2/82 73/856 |
| 2016/0231210 A1 * | 8/2016 | Ganser | ..................... | G01N 3/02 |

* cited by examiner

*Primary Examiner* — Lisa M Caputo
*Assistant Examiner* — Nigel H Plumb
(74) *Attorney, Agent, or Firm* — Owens Law Firm, PC

(57) ABSTRACT

The invention comprises an apparatus for testing mechanical materials, including, but not limited to, plates, welded pipes, metal shells, and the like. The apparatus may include an outer module; an inner module, wherein the inner module is affixed to a target mechanical material to be tested; and at least one main bolt, wherein the at least one main bolt physically contacts the outer module and the inner module. In some embodiments, the inner module may include a plurality of clasps for holding the target material. A mechanical force can be applied to the main bolt, which results in application of mechanical force to the target mechanical material for testing. Additionally, the apparatus does not require any hydraulic elements or electrical elements.

18 Claims, 9 Drawing Sheets

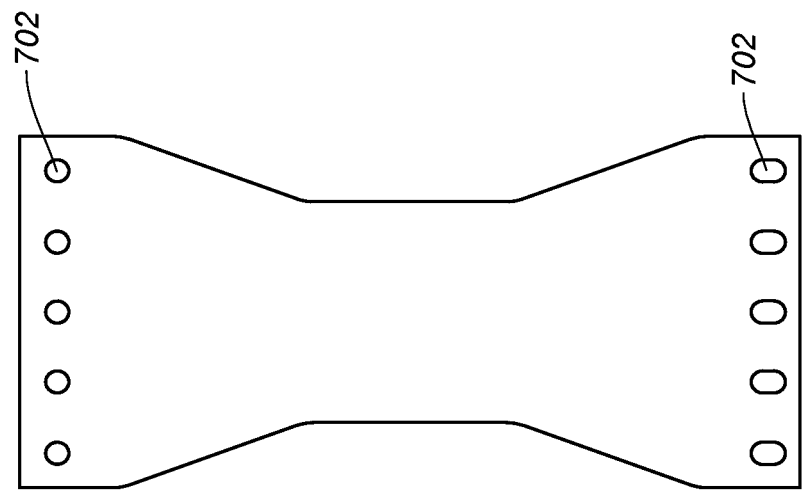
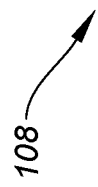
FIG. 7

APPARATUS AND METHOD FOR TESTING MECHANICAL MATERIALS

BACKGROUND OF THE INVENTION

Field of the Invention

The invention in its various embodiments relates generally to equipment for testing mechanical materials, including, but not limited to, metal plates, metal shells, metal pipes, and the like, as well as methods for such testing. In particular, the invention in its various embodiments relates to an apparatus for testing a mechanical material by applying mechanical force, stress, or displacement to that material.

Description of Related Art

Mechanical materials are commonly tested in stressed conditions to characterize various properties of the materials for engineering or research purposes. It is desirable to perform such testing as easily and economically as possible. Therefore, there is a need for a means to test mechanical materials in a simple, inexpensive, and easy-to-use fashion. In some cases, it is also desirable to apply engineering loads to a test material to support additional exercises that extend beyond the investigation of purely mechanical material properties.

BRIEF SUMMARY OF THE INVENTION

In general, the invention comprises an apparatus for testing mechanical materials, including, but not limited to, plates, welded pipes, metal shells, and the like. In some embodiments, the apparatus comprises an outer module; an inner module, wherein the inner module is affixed to a target mechanical material to be tested; and at least one main bolt or load bolt, wherein the at least one main bolt physically contacts the outer module and the inner module. It should be appreciated that in some embodiments of this device, a stud and nut combination can be used in the place of the at least one main bolt.

In at least one embodiment of the above invention, the apparatus may be used as follows. A user may insert a target mechanical material to be tested, such as a piece of a metal shell or a metal pipe, into an inner module. The user may then apply mechanical force to at least one main bolt that physically contacts the inner module. Purely as a non-limiting example, such mechanical force may be achieved by physically tightening the at least one main bolt by turning the at least one main bolt. Application of mechanical force to the at least one main bolt thus results in mechanical force being applied to the target material to be tested.

In further embodiments of the invention, the outer module comprises a plurality of end pieces; and a plurality of rectangular tubes, wherein the plurality of rectangular tubes connects the plurality of end pieces. In certain embodiments of the invention, the plurality of end pieces may comprise, for example, two end pieces, namely, a first end piece and a second end piece. The first end piece may comprise at least one main bolt hole, which physically contacts or accommodates, at least one main bolt. It should be appreciated that the second end piece may also comprise at least one main bolt hole, in a manner symmetrical to or otherwise compatible with, the first end piece. It should further be appreciated that the second end piece may physically contact at least one main bolt. In such embodiments of the invention, it is possible that at least two main bolts are present. Purely as a non-limiting example, it is possible that two main bolts are present, with a first main bolt in physical contact with the first end piece, and with a second main bolt in physical contact with the second end piece.

In certain embodiments of the invention, the plurality of rectangular tubes may be constructed in such a way that the plurality of rectangular tubes may be lengthened to achieve a greater amount of physical distance between the first end piece and the second end piece, thereby providing the user with the ability to select the appropriate physical distance. It should be appreciated that adjustment of the plurality of rectangular tubes in such a fashion could accommodate insertion of target mechanical materials of different sizes in the inner module. It should therefore be appreciated that a user may be able to test target mechanical materials of different sizes using at least some embodiments of the present invention.

In further embodiments of the invention, the inner module comprises a plurality of clasps, wherein the plurality of clasps is affixed to the target material to be tested. The plurality of clasps may, in certain embodiments, comprise a plurality of bolt holes and a plurality of bolts, wherein the plurality of bolts physically contacts the plurality of bolt holes and the target material. In certain embodiments of the invention, the inner module may also comprise a plurality of hinges, wherein at least one of the plurality of hinges physically contacts at least one of the plurality of clasps. The inner module may, in some embodiments of the invention, further comprise a plurality of hinge supports, wherein at least one of the plurality of hinge supports physically contacts at least one of the plurality of hinges.

As described previously, a user may utilize the apparatus that is an embodiment of the present invention to apply mechanical force to a target material in order to test the target material against various amounts of forces, including, but not limited to, stress forces, tension forces, compression forces, and the like. As described above, in at least one embodiment of the present invention, a user may apply mechanical force to the target material by applying mechanical force to at least one main bolt. In certain aspects of the invention, the apparatus comprises at least one force multiplier, wherein the at least one force multiplier physically contacts the at least one main bolt. It should be appreciated that utilization of the at least one force multiplier enables application of a proportionally greater amount of force to the target material per unit of mechanical force supplied by the operator of the device. Additionally, in some aspects of the invention, the apparatus further comprises at least one thrust bearing, wherein the at least one thrust bearing physically contacts the at least one main bolt and the outer module of the apparatus. It should be appreciated that utilization of the at least one thrust bearing enables a reduction of frictional forces between various portions of the apparatus, including, but not limited to, a reduction of frictional forces between the at least one main bolt and the outer module. Use of such a thrust bearing can reduce wear on the device and enable additional mechanical efficiency in the transfer of force from the operator of the device to the test material.

It should be appreciated that in at least some of the embodiments of the present invention, the apparatus comprises neither any hydraulic elements nor any electrical elements. The apparatus may therefore enable a user to test various target materials in a simple, easy-to-use manner that does not rely on complex non-mechanical systems, including, but not limited to, a hydraulic system, an electrical system, or the like. It should therefore be appreciated that the apparatus in at least some of the embodiments of the present invention may be easily utilized in challenging environments, such as field measurement stations, in which electrical or hydraulic connections are either unavailable, cost-prohibitive, unsafe, or the like The invention in its various embodiments may also comprise a method for generating mechanical force on a target material, such as, for example, for purposes of stress testing the target material. In some embodiments of the invention, the method comprises placing a target material into an apparatus, wherein the apparatus comprises an outer module, an inner module, wherein the inner module is affixed to a target material, and at least one main bolt, wherein the at least one main bolt physically contacts the outer module and the inner module; and applying force on the at least one main bolt of the apparatus, thereby generating mechanical force on the target material.

In certain aspects of the invention, the method described above further comprises securing the target material to the inner module. In some aspects of the invention, the securing of the target material to the inner module comprises bolting the target material to the inner module. It should be appreciated that other appropriate methods of securing or attaching the target material to the inner module may be used, including, but not limited to, straps, screws, and the like.

BRIEF DESCRIPTION OF THE SEVERAL
VIEWS OF THE DRAWINGS

FIG. 7 illustrates a top view of the target material of FIG. 1 according to one embodiment of the invention.

DETAILED DESCRIPTION OF THE
INVENTION

The present invention is more fully described below with reference to the accompanying Figures. While the invention will be described in conjunction with particular embodiments, it should be understood that the invention includes alternatives, modifications, and equivalents. Accordingly, the following description is exemplary in that several embodiments are described (e.g., by use of the terms "preferably," "for example," or "in one embodiment"), but this description should not be viewed as limiting or as setting forth the only embodiments of the invention, as the invention encompasses other embodiments not specifically recited in this description. Further, the use of the terms "invention," "present invention," "embodiment," and similar terms throughout this description are used broadly and are not intended to mean that the invention requires, or is limited to, any particular aspect being described or that such description is the only manner in which the invention may be made or used.

Generally, the invention comprises an apparatus for testing mechanical materials, including, but not limited to, plates, welded pipes, metal shells, and the like. In some embodiments, the apparatus comprises an outer module; an inner module, wherein the inner module is affixed to a target mechanical material to be tested; and at least one main bolt, wherein the at least one main bolt physically contacts the outer module and the inner module.

In at least one embodiment of the above invention, the apparatus may be used to generate or apply a mechanical force to a target material for purposes of stress testing. A user may insert a target mechanical material to be tested, such as a piece of a metal shell or a metal pipe, into an inner module. The user may then apply mechanical force to at least one main bolt that physically contacts the inner module. Purely as a non-limiting example, such mechanical force may be achieved by physically tightening the at least one main bolt by turning the at least one main bolt. Application of mechanical force to the at least one main bolt thus results in mechanical force being applied to the target material to be tested. It should be appreciated that in some embodiments of this device, a stud and nut combination can be used in the place of the at least one main bolt. It should be appreciated that the present invention does not require hydraulic or electrical elements for its operation or use.

Figure 1:
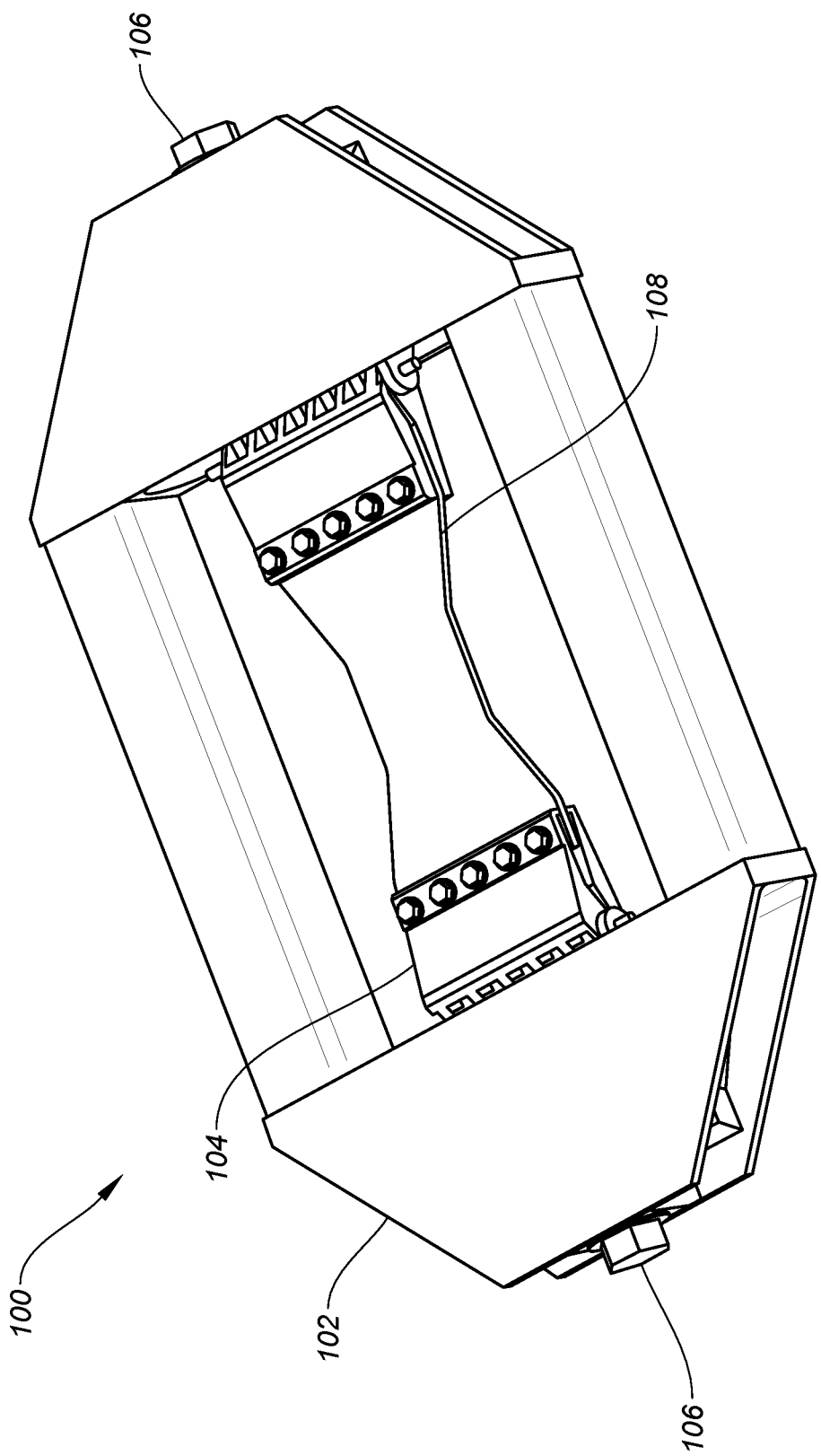
FIG. 1 illustrates a perspective view of an apparatus for testing mechanical materials, according to one embodiment of the present invention.

FIG. 1 illustrates a perspective view of an apparatus 100 for testing mechanical materials, including, but not limited to, metallic portions or pieces of objects such as, for example, plates, pipes or shells. As depicted, the apparatus 100 generally comprises an outer module 102 or housing, a pair of inner modules 104, and a pair of main bolts 106. Also shown is a target material 108 to be tested, which in this example is a flat piece of metal. The outer module 102 holds the inner modules 104, which are disposed opposite to each other. Each of the inner modules 104 holds one end of the target material 108. In other words, the target material 108 is disposed within and held in place during testing by the pair of inner modules 104. Each main bolt 106 is connected to an opposite side of the outer module 102 through a bolt hole in the outer module 102 and can be advanced inwardly within the outer module 102 via turning or screwing. Each main bolt 106 passes through the bolt hole in the outer module 102 and into a second main bolt hole within the inner module 104. In some embodiments, the bolt hole in the outer module 102 is not threaded, while the second main bolt hole within the inner module 104 is threaded. In this fashion, as one or both of the main bolts 106 are advanced inwardly, each corresponding inner module 104 is also advanced inwardly in a linear fashion toward the center of the apparatus 100. To utilize the apparatus 100, a user may also turn, twist, or otherwise move the main bolt 106 so as to advance the main bolt 106 into the inner module 104. The advancement of the main bolt 106 will cause the inner module 104 and, by extension, the target material 108, to translate away from the center of the apparatus 100, thereby causing mechanical stress to accumulate on the target material 108. Additionally, a user may fix one end of the target material 108 by advancing the corresponding main bolt 106 to a preset location or position. The user may then advance the opposite main bolt 106 into the inner module 104, thereby causing mechanical stress to accumulate on the target material 108. Accordingly, with a target material 108 in place, advancing one or both of the main bolts 106 inwardly moves or pushes a corresponding inner module 104, thereby applying a mechanical force against the target material 108, which produces a stress in the target material 108 that can be measured. It should be appreciated that in use, there is flexibility in which of the main bolts 106 is advanced inward. One of skill in the art will appreciate that advancing either of the main bolts 106 inwardly generates a mechanically equivalent effect on the target material 108 as advancing both of the main bolts 106 inwardly together. As a result, a user may opt to advance one of the main bolts 106 inwardly without advancing the other of the main bolts 106.

In certain embodiments of the invention, two additional, smaller bolts (not shown in FIG. 1) may be used in conjunction with each main bolt 106, and may be placed on either side of each main bolt 106 for the purpose of stabilizing motion of the main bolt 106 into the inner module 104. It should be appreciated that a user may also advance one or both of these smaller bolts inwardly to apply additional mechanical force against the target material 108.

It should be appreciated that in some embodiments, more than one main bolt 106 may be used on each side of the outer module 102. In some embodiments, multiple main bolts may be aligned in a row on one or both sides of the outer module 102. In this fashion, adjusting each of the multiple main bolts allows for the application of a wider range of the amount or magnitude of mechanical force or stress that is applied to the target material 108. In addition, more precise control over the specific amount of mechanical force or stress applied to the target material 108 can be achieved through the use of multiple main bolts. Further, the need for additional main bolts may be influenced by the size or dimensions of the target material so that mechanical force can be properly or evenly applied to the target material. In some embodiments, two or more main bolts on each side of the outer module 102 may be used. One of skill in the art will appreciate that usage of one main bolt 106 on each side of the outer module 102 may be desirable, especially in conjunction with two smaller bolts, one of which is placed on either side of the main bolt 106. As described above, deploying two smaller bolts in this fashion stabilizes motion of the main bolt 106 into the inner module 104.

Figure 1A:
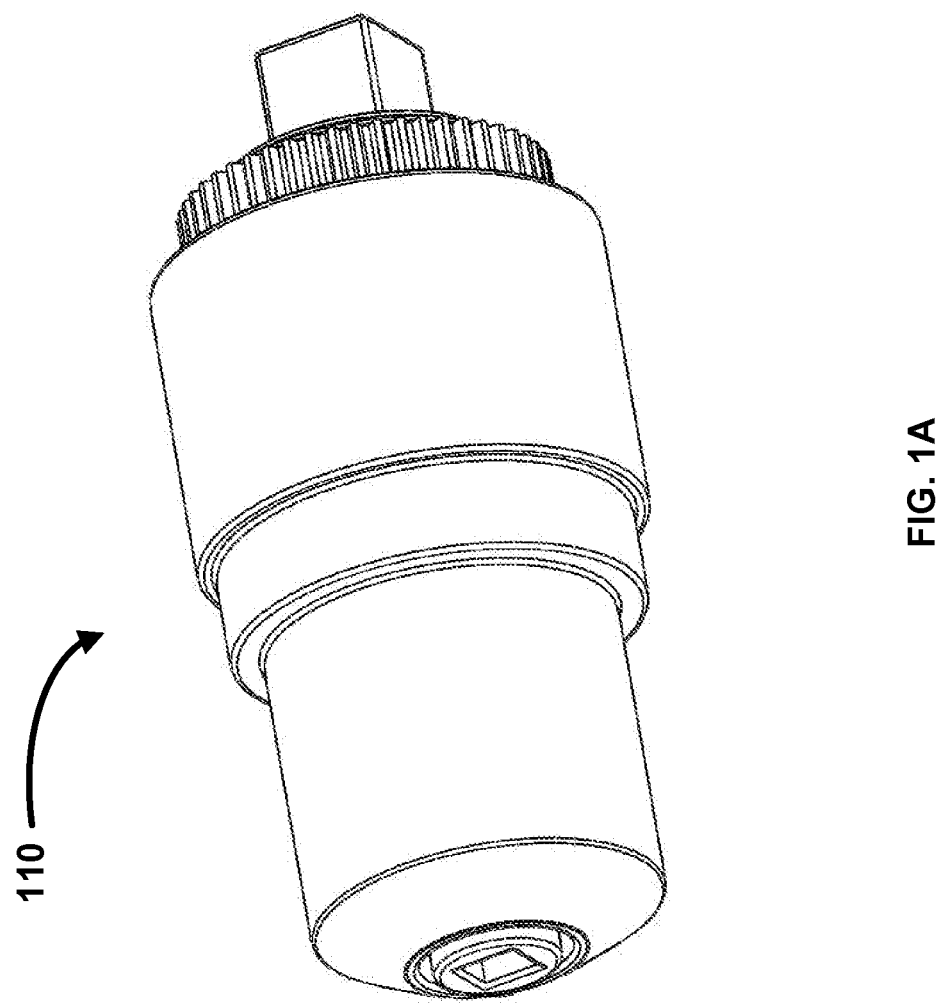
FIG. 1A illustrates a perspective view of a torque multiplier.
Figure 1B:
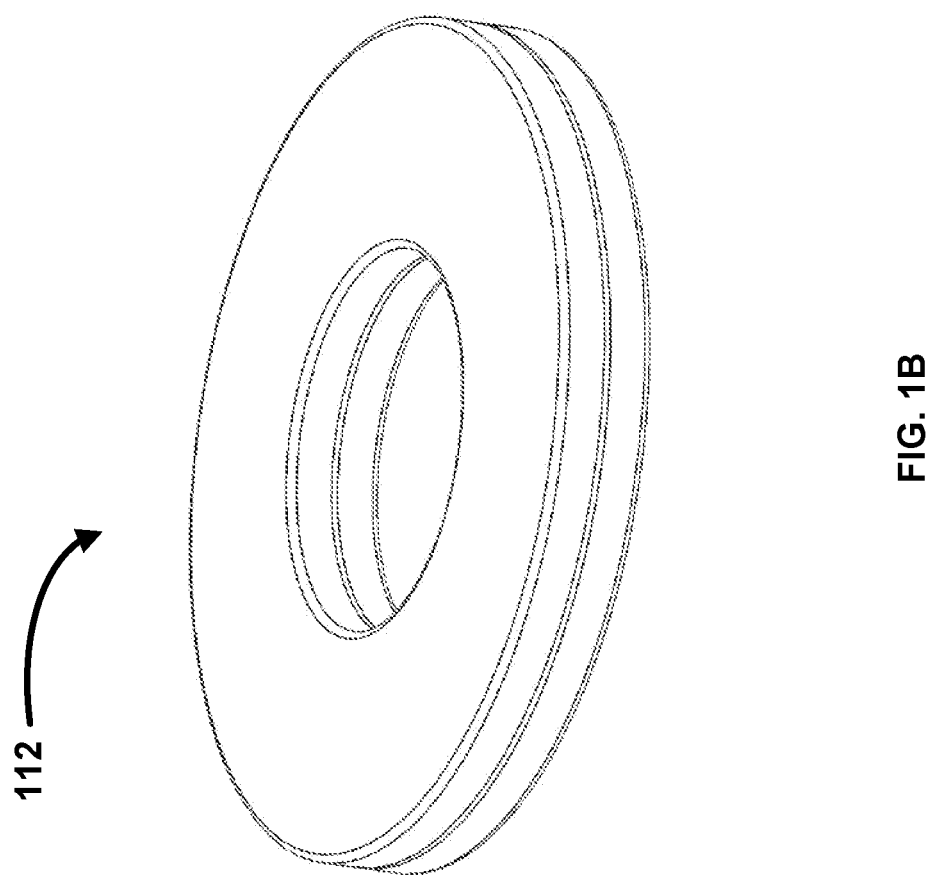
FIG. 1B illustrates a perspective view of a thrust bearing.

It should be appreciated that a variety of additional elements may be used in conjunction with the at least one main bolt 106 during operation of the apparatus 100 to apply mechanical force to the target material 108. Purely as a non-limiting example, a force multiplier 110 (shown in Fig. 1A) may be utilized to amplify any mechanical force applied to the at least one main bolt 106. One of skill in the art will appreciate that a force or torque multiplier comprises an input terminal to receive an input torque and an output terminal to transfer an output torque that is greater than the input torque. It should be appreciated that a user of the apparatus 100 may attach an output terminal of a force or torque multiplier to a socket that is appropriately matched to the size of the main bolt 106. The user may then utilize the force or torque multiplier to increase the amount of mechanical force applied to the main bolt 106. Additionally, as another non-limiting example, a thrust bearing 112 (shown in Fig. 1B) may be placed in physical contact with the at least one main bolt 106 to reduce any frictional forces between the at least one main bolt 106 and any other element of the apparatus, such as, for example, the outer module 102.

One of skill in the art will appreciate that the apparatus 100 depicted in FIG. 1 is primarily or solely mechanical in nature. The apparatus 100 does not comprise, and need not comprise, any hydraulic elements or any electrical elements. Therefore, a skilled artisan will realize that the apparatus 100 may be utilized in situations where any presence of hydraulic elements or electrical elements may be impractical, cost-prohibitive, or potentially dangerous. Purely as a non-limiting example, the apparatus 100 may be utilized at field sites or at field measurement stations.

Figure 2:
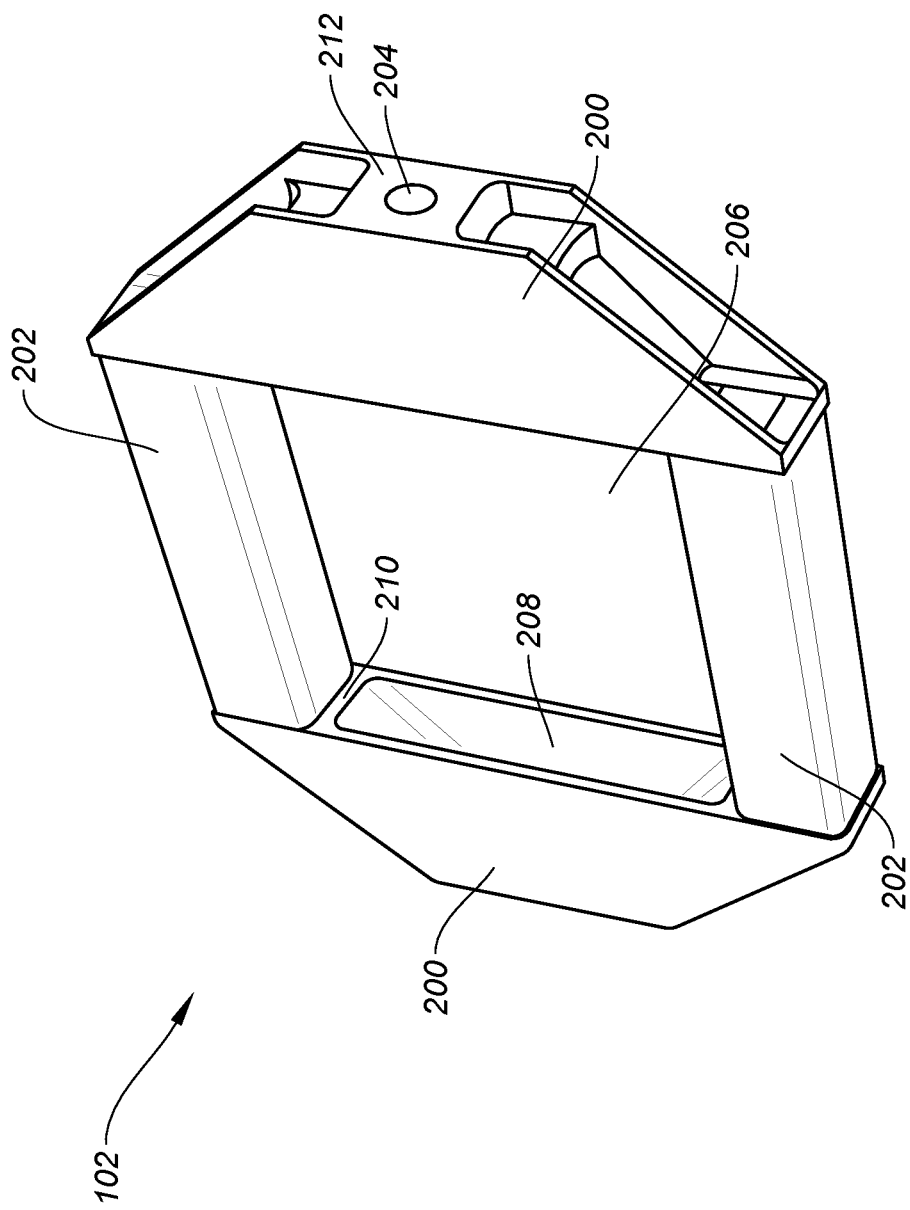
FIG. 2 illustrates a perspective view of the outer module of FIG. 1 according to one embodiment of the present invention.

FIG. 2 illustrates a perspective view of the outer module of FIG. 1 according to one embodiment of the present invention. As depicted, the outer module 102 comprises a pair of end pieces 200 that are disposed at opposite ends of the outer module 102. The outer module 102 also comprises two side pieces 202 that connect the two end pieces 200 together to form an opening 206 within which the inner modules 104 and ultimately the target material 108 will be disposed. In one embodiment, each side piece 202 is connected at each of its ends to a respective end piece 200 such that each side piece 202 is parallel to the other. It should be appreciated that each of the side pieces 202 is connected to each of the end pieces 200 so that, as noted above, the end pieces are opposite to each other. It should be appreciated that the shape and dimensions of the side pieces 202 may be any shape or have any dimensions desired that are suitable to both sustain the load necessary to hold each end piece 200 at the appropriate distance from one another and provide the necessary cavity for receipt of the target material. In one embodiment, the side piece 202 is a rectangular tube, although it should be appreciated that other geometries for the side pieces 202 may be used. In one embodiment as shown in FIG. 2, each end piece 200 is connected to each rectangular tube 202 in such a way as to provide a roughly rectangular framework for the apparatus 100. It should also be appreciated that each rectangular tube 202 may be constructed in such a way that each side piece 202, such as a rectangular tube, may have varying lengths to achieve a greater degree of physical distance between each end piece 200 and, therefore, accommodate target materials of different sizes. In some embodiments, the length of side pieces 202 or rectangular tubes is adjustable. The adjustment of each rectangular tube 202 can accommodate insertion of target materials of different sizes into the apparatus 200 by using the same apparatus. It should be appreciated that each rectangular tube 202 may be constructed with a telescoping mechanism or other design mechanism that enables selection of a desired length for each rectangular tube 202. It should also be appreciated that a desired length for each rectangular tube 202 could be set or stabilized using a hole-and-pin locking scheme, which is well-known in the art. Additionally, a user may adjust the length of each rectangular tube 202 by removing a rectangular tube 202 of a particular length and substituting another rectangular tube 202 of a different length. For example, a user may have a plurality of rectangular tubes 202, each of different lengths. A user could then select a rectangular tube 202 of a desired length, depending on the dimensions of the target material 108. As a result, a user may be able to test target materials of different sizes by, at least in part, adjusting each rectangular tube 202 using any of the methods described above. One of skill in the art will also appreciate that each end piece 200 may be constructed of any suitable material that could withstand the application of different intensities of mechanical force, including, but not limited to, aluminum, aluminum alloys, steel, steel alloys, and the like.

Each end piece 200 has a cavity or opening 208 on an inner surface 210 of the end piece 200, which is a surface of each end piece 200 that faces the opening 206 created by the end pieces 200 and the side pieces 202 and may be the same surface to which the side pieces 202 are attached. In this configuration, the cavity or opening 208 of each end piece 200 faces the opening 206 created by the end pieces 200 and the side pieces 202 and that faces the cavity or opening 208 of the other end piece 200. Each end piece 200 also has a main bolt hole 204 for receipt of the respective main bolts 106 depicted in FIG. 1. Each main bolt hole 204 is located on an outer surface 212 of each end piece 200, which is a surface of each end piece 200 that is opposite to that end piece's corresponding inner surface 210 and that is on the outside perimeter of the end pieces 200 when connected with the side pieces 202. Each main bolt hole 204 extends linearly from this outer surface 212 through the body of the end piece 200 to the corresponding cavity or opening 208 of that end piece 200. Accordingly, it should be appreciated that each main bolt hole 204 is configured to allow the corresponding main bolt 106 to extend from the outer surface 212 of the end piece 200 through to, and into, the cavity or opening 208 of that end piece 200. As described further below, this permits each main bolt 106 to transfer mechanical force to the inner module 104 and ultimately to the target material 108. It should be appreciated that the shape and dimensions of the end pieces 200 may be any shape or have any dimensions desired that are suitable to both provide the necessary cavity and main bolt access to effect mechanical force on the target material. Additionally, a skilled artisan will appreciate that each rectangular tube 202 may likewise be constructed of any suitable material that can withstand the application of different intensities of mechanical force, including, but not limited to, aluminum, aluminum alloys, steel, steel alloys, and the like.

It should be appreciated that the overall dimensions of the outer module 102, including its overall length, width and depth, may be scaled to accommodate the size of the target material. One of skill in the art will appreciate that a user could scale the overall dimensions of the outer module 102 to accommodate a larger or smaller size of the target material without altering the geometric shape of the apparatus 100. Further, it should be appreciated that the overall structure of the outer module 102 should be structurally sound or having sufficient strength to hold the target material while mechanical force is being applied or while under stress. It should also be appreciated that in the embodiment in which more than one main bolt 106 is used in conjunction with each end piece 102 that the outer surface 212 of each end piece 102 can simply be configured or designed to accommodate additional main bolts 106. For example, with reference to FIG. 2, the outer surface 212 can simply be lengthened to accommodate additional corresponding main bolt holes 204, which can be oriented side by side, such that each bolt hole 204 would extend through the body of the end piece 200 to the same cavity or opening 208 of that end piece 200, noting that the width of the cavity 208 would need to be at least as wide as the distance between the outer edge of the outer main bolt holes along the outer surface 212 of the end piece 200. Accordingly, it should similarly be appreciated that each main bolt hole 204 would be configured to allow a corresponding main bolt 106 to extend from the outer surface 212 of the end piece 200 through to and into the cavity or opening 208 of that end piece 200. As described further below, this would permit each main bolt 106 to transfer mechanical force to the inner module 104 and ultimately to the target material 108. It should also be appreciated that the orientation of the main bolt holes 204 may be of any pattern desired to allow the corresponding main bolt 106 to impart the proper mechanical force, such as side-by-side along the outer surface 212, in columns, or in a repeating or non-repeating pattern.

Figure 3:
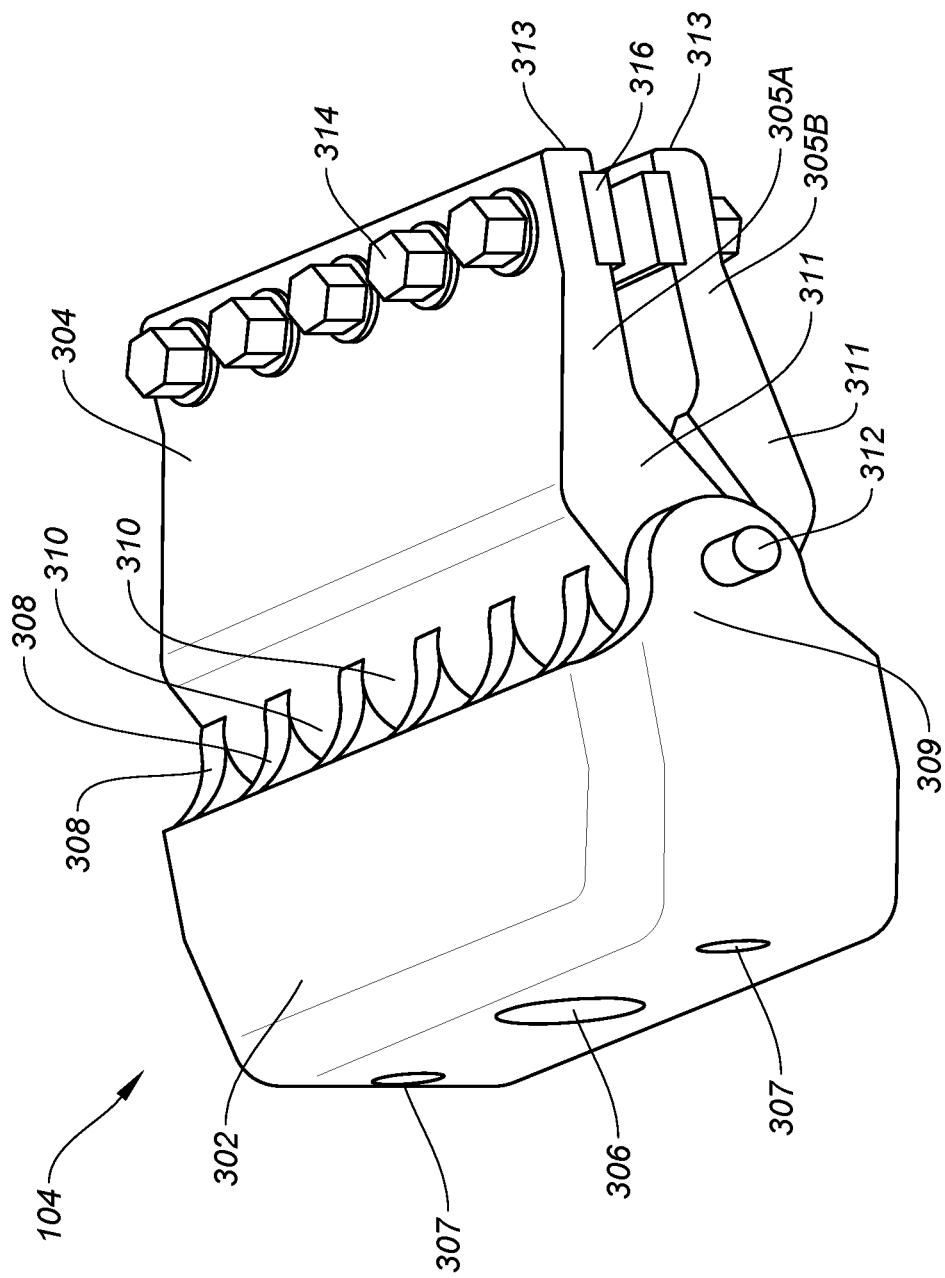
FIG. 3 illustrates a perspective view of the inner module of FIG. 1 according to one embodiment of the present invention.

FIG. 3 illustrates a perspective view of the inner module of FIG. 1 according to one embodiment of the present invention. The inner module 104 is a connector to hold the target material 108 in place during testing and fits within the outer module 102. The inner module 104 includes a hinge support 302 and a clasp 304 connected to the hinge support 302. It should be appreciated that two such inner modules 104 are used in this embodiment of the present invention; however, only one inner module is shown in FIG. 3. The hinge support 302 is a body or structure that has a second main bolt hole 306 and connects to the clasp 304. The second main bolt hole 306 permits receipt of the main bolt 106 once it has traversed through the main bolt hole 204 in the outer module 102. It should be appreciated that the second main bolt hole 306 is threaded, while the main bolt hole 204 in the outer module 102 is not threaded. The receipt of the main bolt 106 by this second main bolt hole 306 permits the direct application of mechanical force against the inner module 104 when the main bolt 106 is advanced inwardly. One of skill in the art will note that, in certain applications, turning the main bolt 106 may result in movement of at least a portion of the inner module 104 from inside the cavity 208 to the opening 206. Thus, it is possible for the inner module 104 to move completely from inside the cavity 208 to the opening 206 when the apparatus 100 is in use. Due to various considerations, including, but not limited to, safety considerations, it may be desired for the apparatus 100 to be utilized under specific conditions or circumstances that allow for the inner module 104 to remain inside the cavity 208 or at least partially inside the cavity 208. Although not required, it should also be appreciated that a lubricating oil or graphite powder may optionally be used on the threads of the main bolt to reduce friction.

Additionally, one auxiliary bolt hole 307 is distributed on each side of the second main bolt hole 306. Each auxiliary bolt hole 307 permits placement of an additional, smaller bolt (not shown in FIG. 3) that may be used in conjunction with main bolt 106 once the main bolt has traversed through the main bolt hole 204 in the outer module 102. In some embodiments, the additional, smaller bolts deployed in the auxiliary bolt holes 307 may be used for the purpose of stabilizing motion of the main bolt 106 once the main bolt has traversed through the main bolt hole 204 in the outer module 102. It should be appreciated that the auxiliary bolt holes 307, at least in such embodiments, may not be threaded. In other embodiments, the additional, smaller bolts deployed in the auxiliary bolt holes 307 may be advanced inwardly to apply additional mechanical force against the target material 108. It should be appreciated that the auxiliary bolt holes 307, at least in these embodiments, may be threaded.

As noted, the hinge support 302 connects to the clasp 304. Specifically, the hinge support 302 includes extensions 308 that are distributed along one side 309 of the hinge support 302 and extend outwardly from the hinge support 302 in a parallel fashion to one another with equal amounts of space in between each of the extensions 308. The clasp 304 has a top clasp 305A and a bottom clasp 305B, with each of the top and bottom clasps 305A, 305B having a corresponding set of extensions 310 that are distributed along one end 311 of each of the top and bottom clasps 305A, 305B, as described further in connection with FIG. 4, and extend outwardly from each of the top and bottom clasps 305A, 305B in a parallel fashion to one another with equal amounts of space in between each of the extensions 310. Accordingly, the extensions 308 on the hinge support 302 and the extensions 310 on each of the top and bottom clasps 305A, 305B are sized and spaced relative to each other to allow the set of extensions 308 on the hinge support 302 and both sets of the extensions 310 on each of the top and bottom clasps 305A, 305B to fit together, such that one extension 310 from the top clasps 305A and one extension 310 from the bottom clasp 305B would fit adjacent to each other and in between an adjacent pair of extensions 308 on the hinge support 302 in a repeating fashion along the side 309 of the hinge support 302 and both ends 311 of the top and bottom clasps 305A, 305B. Further, each extension 308, 310 on the hinge support 302 and each of the top and bottom clasps 305A, 305B have a hole, such that when the extensions 308, 310 are fitted together as described, the holes line-up and form a circular opening passing through each of the extensions 308, 310 and parallel along the side 309 of the hinge support 302 and the ends 311 of the top and bottom clasps 305A, 305B. A hinge rod or circular shaft 312 is inserted through this opening and extends from one end of the extensions 308, 310 to the other end. This hinge rod or circular shaft 312 can be held in place via nuts or other retaining devices applied to each end of the hinge rod or shaft. Accordingly, both the top and bottom clasps 305A, 305B can rotate about this hinge 312 such that their respective ends 313 cooperate to open and close relative to each other, which provides for the connection of the target material to the clasp 304.

At each end 313 of each of the top and bottom clasps 305A, 305B the target material 108 may be affixed by means of a plurality of clasp bolts 314 that traverse through each end 313 of each of the top and bottom clasps 305A, 305B, as well as through one end of the target material 108 that is disposed between the ends 313 of each of the top and bottom clasps 305A, 305B. Additionally, an insert 316 may be disposed between the surface of each of the top and bottom clasps 305A, 305B and the target material 108. Similarly, the plurality of clasp bolts 314 may traverse each insert 316 to secure it in place. Each insert 316 may be used to provide a uniform amount of space between the target material 108 and each of the top and bottom clasps 305A, 305B. It should be appreciated that each insert 316 enables a proper orientation of the holes in each of the top and bottom clasps 305A, 305B that accommodate the plurality of clasp bolts 314 with the actual clasp bolts themselves. It should further be appreciated that the thickness of the insert 316 may be adjusted to accommodate different thicknesses of the target material 108. Accordingly, it should be appreciated that application of mechanical force to the main bolt 106 results in mechanical force being applied through the hinge structure 302 to the clasp 304 and ultimately to a target material 108. Again, it should be appreciated that, in the described embodiment, there are two inner modules 104, each having a hinge support 302 and corresponding top and bottom clasps 305A, 305B that form the clasp 304, wherein each one of the inner modules 104 holds a corresponding end of the target material 108 as shown in FIG. 1.

It should also be appreciated that one or more, or all, elements of the hinge structure 302 and the clasps 304, as well as the inserts 316 may be constructed from any material suitable for withstanding various intensities of mechanical force, including, but not limited to, aluminum, aluminum alloys, steel and steel alloys. It should further be appreciated that various suitable materials will be known to one of skill in the art. It should also be appreciated that other fixtures may be used to attach to the target material.

Figure 4:
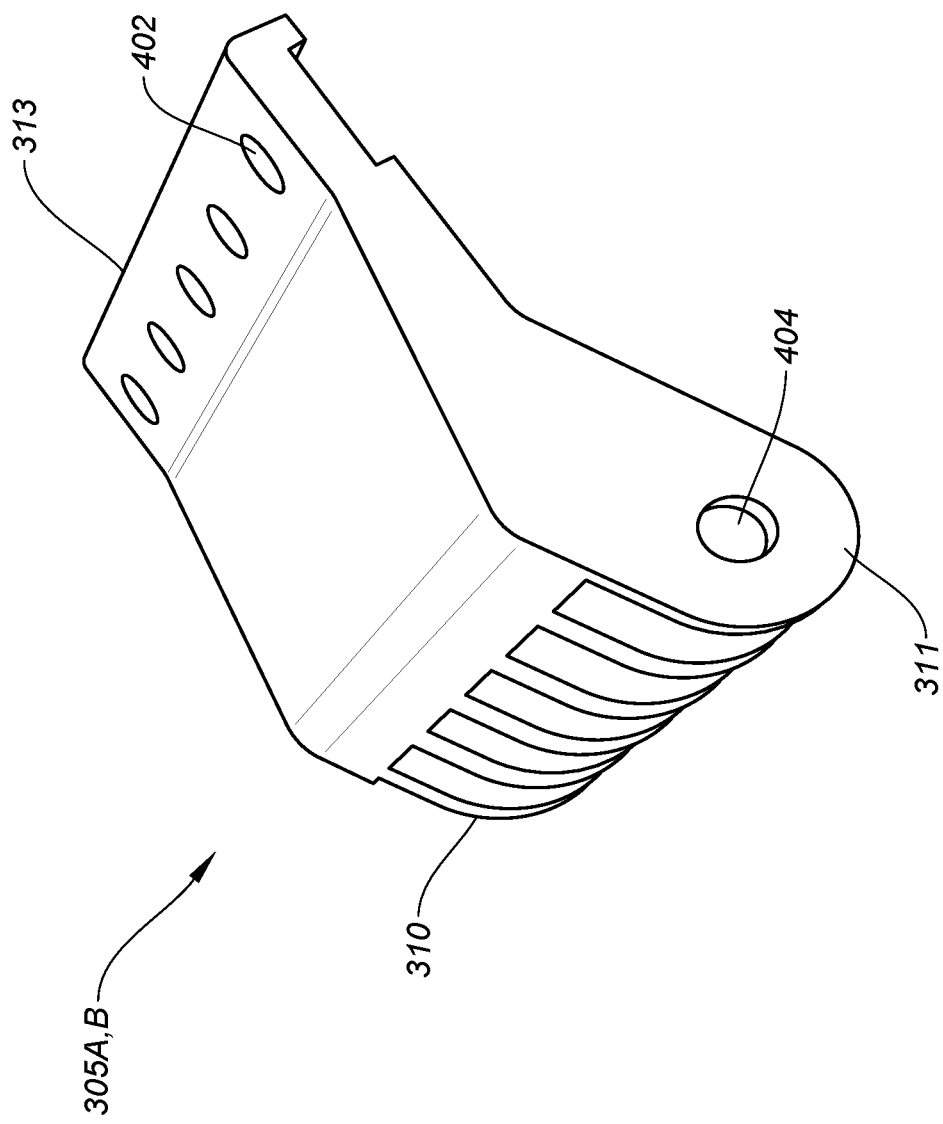
FIG. 4 illustrates a perspective view of the clasp of FIG. 3 according to one embodiment of the invention.

FIG. 4 illustrates a perspective view of the clasp of FIG. 3 according to one embodiment of the invention. The clasp 304 has two portions, a top clasp 305A and a bottom clasp 305B. As shown, each clasp portion (i.e., each of the top clasp 305A and the bottom clasp 305) is a single body that is substantially flat with squared ends at the end 313 that connects to the target material 108 and is angled at the opposite end 311 where the extensions 310 are located. This angle permits each clasp portion 305A, 305B to be fitted together with the extensions 308 on the hinge support 302 and to rotate about the circular shaft 312. Each clasp portion 305A, 305B has a plurality of clasp bolt holes 402 near its end 313 that connects to the target material 108. These clasp bolt holes 402 allow each of the clasp bolts 314 to pass through this portion of each clasp portion 305A, 305B. As shown in FIG. 3, the top of each of the clasp bolts 314 rests on the top of this portion of the top clasp 305A and can be secured with a nut on the opposite portion of the bottom clasp portion 305B. Each extension 310 of each clasp portion 305A, 305B has a clasp hinge hole 404 through which the hinge 312 is disposed to allow each clasp portion 305A, 305B to rotate about the hinge 312.

Figure 5:
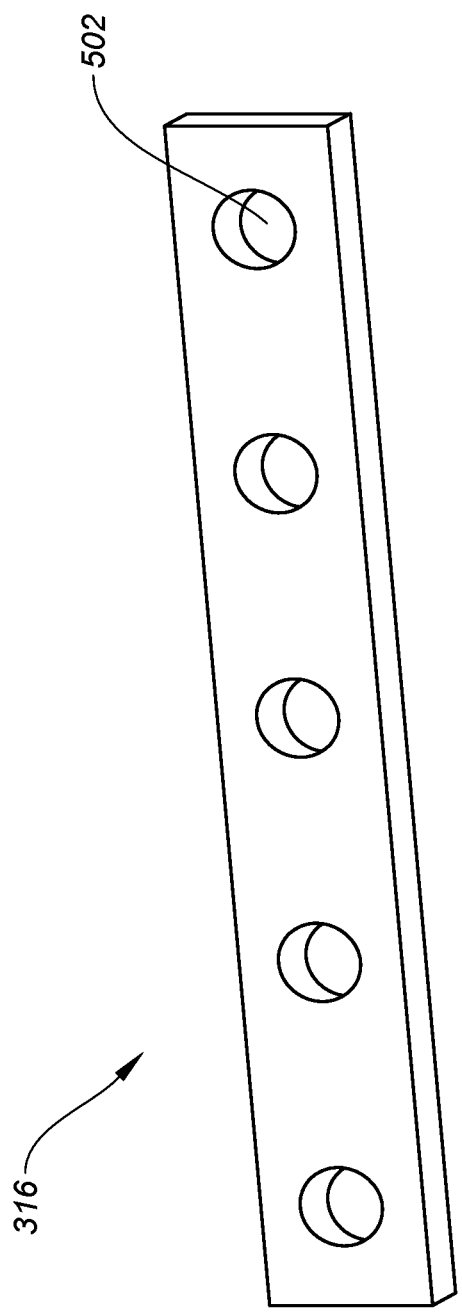
FIG. 5 illustrates a perspective view of the insert of FIG. 3 according to one embodiment of the invention.

FIG. 5 illustrates a perspective view of the insert of FIG. 3 according to one embodiment of the invention. The insert 316 is a relatively flat rectangular body that has a length that matches the width of the clasp portion 305A, 305B to which it is attached. The insert 316 has a plurality of insert bolt holes 502. These insert bolt holes 502 are aligned with the clasp bolt holes 402 to allow the clasp bolts 314 to pass through this portion of the insert 316. As described previously, such a construction would permit bolting of the target material 108 to each clasp 304. In particular, the surface of the target material 108 would be adjacent to, and in contact with, the surface of each insert 316. It should be appreciated that contact between the target material 108 and the surface of each insert 316 prevents each clasp portion 305A, 305B from closing too far on to the target material 108 and thereby creating a binding condition for the clasp bolts 314. The thickness of each insert 316 is designed according to a specific mathematical formula. Specifically, the thickness of the target material 108 plus two times the thickness of each insert 316 equals the proper distance to be maintained between each clasp portion 305A, 305B when these clasp portions are closed relative to each other and bolted to the target material using the clasp bolts 314. One of skill in the art will appreciate that different inserts 316, each with a different thickness, may be used in conjunction with the apparatus 100, such that a user may select a given insert 316 depending on the thickness of the target material 108 to be tested. As described above, a user may select a given insert 316 to produce the appropriate distance between each clasp portion 305A, 305B when these clasp portions are closed relative to each other.

Figure 6:
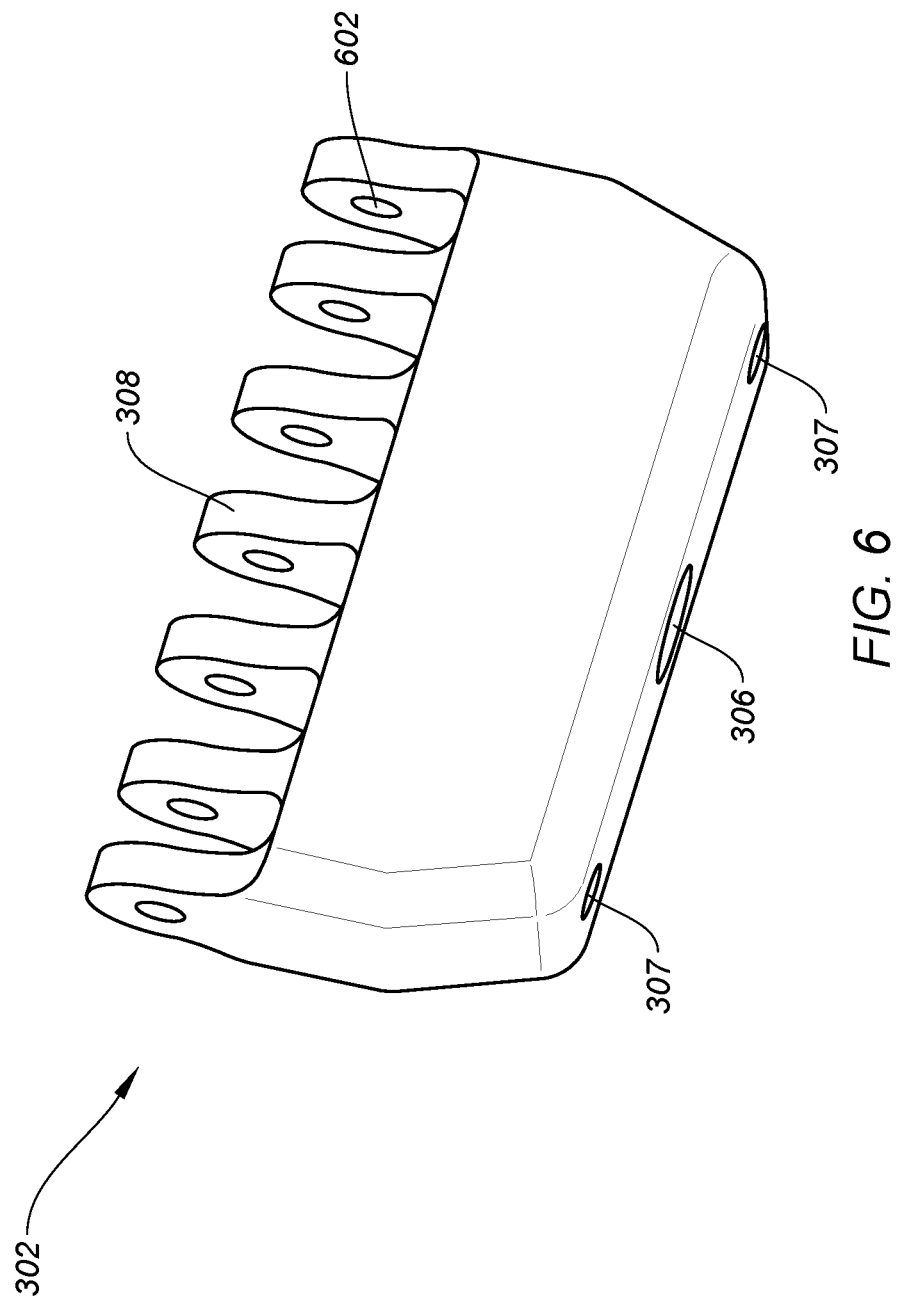
FIG. 6 illustrates a perspective view of the hinge support of FIG. 3 according to one embodiment of the invention.

FIG. 6 illustrates a perspective view of the hinge support of FIG. 3 according to one embodiment of the invention. As depicted previously (e.g., FIG. 3), the hinge support 302 includes a hinge support main bolt hole 306. As described in conjunction with FIG. 3, the main bolt 106 passes through the hinge support main bolt hole 306. The hinge support 302 also includes auxiliary bolt holes 307. As described in conjunction with FIG. 3, the auxiliary bolt holes 307 may, in some embodiments of the invention, be utilized to stabilize motion of the main bolt 106 once the main bolt has traversed through the main bolt hole 204 in the outer module 102. In additional embodiments of the invention, as described in conjunction with FIG. 3, the auxiliary bolt holes 307 may be advanced inwardly to apply additional mechanical force against the target material 108. The hinge support 302 also has a plurality of hinge support holes 602 through which the hinge 312 passes. Thus, it should be appreciated that hinge support 306 and two of each clasp 304 may contact the same hinge 304. Also shown are the extensions 308 that interface with the extensions 310 on each of the top and bottom clasp portions 305A, 305B.

FIG. 7 illustrates a top view of the target material of FIG. 1 according to one embodiment of the invention. The target material 108 may be any metal or material upon which a mechanical force is to be applied for testing, such as stress testing. Therefore, it should be appreciated that other types of target mechanical materials may be tested in apparatus 100 depicted in FIG. 1. One of skill in the mechanical arts will realize that the apparatus 100 is not limited to testing mechanical materials of a specific size, shape, composition, construction, or any other parameter.

As shown, in this embodiment, the target material 108 is shown as a flat metal plate, which can be constructed from the material for which testing is desired. As depicted in FIG. 7, the target material 108 comprises a plurality of target material bolt holes 702 disposed at each of its ends, which allow the target material 108 to be bolted at each of its ends to each clasp 304, specifically in conjunction with the top and bottom clasp portions 305A, 305B that form each of the two clasps 304. Specifically, each of the clasp bolts 314 passes from the top clasp portion 305A, through a respective clasp bolt hole 402 of the top clasp portion 305A, through a respective insert bolt hole 507 of one insert 316, through a respective target material bolt hole 702, through a respective insert bolt hole 507 of a second insert 316, through a respective clasp bolt hole 402 of the bottom clasp portion 305B and secured by, for example, a nut, on the other side of the bottom clasp portion 305B. It should be appreciated that the target material can be machined with an appropriate shape and size and the appropriate target material holes 702 to fit within the confines of the outer module 102 and the inner module 104. It should be appreciated that the plurality of target material bolt holes 702 on one side of the target material 108 may be slotted holes or holes having an oval shape. These slotted holes may be utilized in securing the target material 108 to one of clasps 304 after that opposing end of the target material has already been secured to its corresponding clasp 304. In this manner, the holes in the target material 108 do not need to be perfectly aligned for installation of the target material in the inner module.

Various embodiments of the invention have been described above. However, it should be appreciated that alternative embodiments are possible and that the invention is not limited to the specific embodiments described above.

What is claimed is:

1. A device for testing the application of a mechanical force on a target material, comprising:
an outer module;
at least one inner module comprising a connector connected to a target material; and
at least one bolt connecting said outer module and said inner module, wherein said at least one bolt is configured to be turned during testing of the target material to apply a mechanical force on the target material.

2. The device of claim 1, wherein said outer module further comprises:
a first end piece defining a cavity;
a second end piece; and
a pair of rectangular tubes that connect said first end piece with said second end piece, thereby defining an opening with a perimeter of said first end piece, said second end piece, and said pair of rectangular tubes; and
wherein said at least one inner module is positioned within said cavity of said first end piece.

3. The device of claim 1, wherein said connector of said inner module comprises:
a clasp comprising two portions, wherein a first one of said portions is disposed opposite to a second one of said portions and where each of said portions are connected by a hinge and configured to hold the target material.

4. The device of claim 3, wherein each of said first and said second one of said portions further comprises:
a plurality of bolt holes; and
a plurality of bolts, wherein each of said bolts passes through a respective one of said bolt holes and the target material.

5. The device of claim 1, further comprising:
at least one force multiplier, wherein said at least one force multiplier physically attaches to said at least one bolt.

6. The device of claim 1, further comprising:
at least one thrust bearing, wherein said at least one thrust bearing physically contacts said at least one bolt and said outer module.

7. The device of claim 1, wherein said device comprises an absence of any hydraulic elements, and wherein said device comprises an absence of any electrical elements.

8. A method for testing the application of a mechanical force on a target material, comprising:
connecting a target material to a device, wherein said device comprises an outer module; a pair of inner modules, each comprising a connector; and at least one bolt connecting said outer module and a first one of said inner modules; wherein the target material comprises a first end opposite a second end and wherein said first end is connected to a first one of said connectors and said second end is connected to a second one of said connectors; and
turning said at least one bolt during testing to apply a mechanical force on the target material.

9. The method of claim 8, wherein said device further comprises a second bolt connecting said outer module to a second one of said inner modules and further comprising:
turning said second bolt during testing to apply a second mechanical force on the target material.

10. The method of claim 9, wherein said turning further comprises:
attaching a force multiplier to said at least one bolt and using said force multiplier to turn said at least one bolt.

11. A device for testing the application of a mechanical force on a target material, comprising:
an outer module comprising a housing;
a pair of inner modules, each comprising a body and a connector connected to said inner module body and configured to hold a target material, wherein said inner modules are oppositely positioned within said housing;
at least one bolt connecting said housing and at least one of said bodies of said inner modules, wherein said at least one bolt can be turned during testing to apply a mechanical force directly to said at least one of said bodies of said inner modules, thereby providing a mechanical force on the target material.

12. The device of claim 11, wherein the target material has a length extending from one of said connectors to the opposite connector and wherein the at least one bolt when turned moves in a direction parallel to the length of the target material.

13. The device of claim 12, further comprising:
a second bolt connecting said housing and a second one of said bodies of said inner modules, wherein said second bolt can be turned during testing to apply a second mechanical force directly to said second one of said bodies of said inner modules, thereby providing a second mechanical force on the target material.

14. The device of claim 13, wherein the second bolt when turned moves in a direction parallel to the length of the target material.

15. The device of claim 11 further comprising:
a second bolt connecting said housing and a second one of said bodies of said inner modules, wherein said second bolt can be turned during testing to apply a second mechanical force directly to said second one of said bodies of said inner modules, thereby providing a second mechanical force on the target material.

16. The device of claim 11, wherein each of said connectors of said inner modules comprises:
a clasp comprising two portions, wherein a first one of said portions is disposed opposite to a second one of said portions and where each of said portions are connected by a hinge and configured to hold the target material.

17. The device of claim 11, further comprising:
at least one force multiplier, wherein said at least one force multiplier physically attaches to said at least one bolt.

18. The device of claim 11, further comprising:
at least one thrust bearing, wherein said at least one thrust bearing physically contacts said at least one bolt and said housing.

* * * * *